(12) United States Patent
Graffy et al.

(10) Patent No.: US 7,182,233 B1
(45) Date of Patent: Feb. 27, 2007

(54) UNIVERSAL PLATFORM SYSTEM FOR HOLDING ACCESSORIES ON THE ROOF OF A WHEELED VEHICLE

(75) Inventors: Thomas F. Graffy, Oxnard, CA (US); Stepan Gevorkyan, Glendale, CA (US)

(73) Assignee: TopLine Mfg. Inc., Paramount, CA (US)

( * ) Notice: Subject to any disclaimer, the term of this patent is extended or adjusted under 35 U.S.C. 154(b) by 262 days.

(21) Appl. No.: 10/702,289

(22) Filed: Nov. 7, 2003

(51) Int. Cl.
*B60R 9/00* (2006.01)
*B60R 9/052* (2006.01)
*B60R 11/00* (2006.01)

(52) U.S. Cl. ............... 224/326; 224/309; 224/310; 224/322; 224/495; 224/572

(58) Field of Classification Search ............ 224/309, 224/326, 317, 310, 311, 314, 316, 325, 321, 224/322, 330, 495, 548, 572, 555, 545, 557, 224/544, 517; 280/462; 414/529
See application file for complete search history.

(56) References Cited

U.S. PATENT DOCUMENTS

| | | | | |
|---|---|---|---|---|
| 3,646,401 A * | 2/1972 | Freegard et al. | ............ | 361/676 |
| 3,719,313 A * | 3/1973 | Tischler | ............ | 224/309 |
| 5,201,487 A * | 4/1993 | Epplett | ............ | 248/298.1 |
| 5,306,156 A * | 4/1994 | Gibbs et al. | ............ | 439/34 |
| 5,454,499 A * | 10/1995 | Gibbs | ............ | 224/324 |
| 5,518,157 A | 5/1996 | Evels et al. | | |
| 5,699,944 A * | 12/1997 | Duran | ............ | 224/326 |
| 5,715,980 A * | 2/1998 | Blankenburg et al. | ............ | 224/321 |
| 5,758,810 A * | 6/1998 | Stapleton | ............ | 224/321 |
| 5,765,737 A * | 6/1998 | Cucheran et al. | ............ | 224/326 |
| 5,893,499 A | 4/1999 | Lumpe et al. | | |
| 5,954,251 A * | 9/1999 | Tress et al. | ............ | 224/309 |
| 6,158,637 A | 12/2000 | Fisch et al. | | |
| 6,378,747 B1 * | 4/2002 | Fisch et al. | ............ | 224/326 |
| 2002/0056789 A1 * | 5/2002 | Jones | ............ | 244/129.1 |
| 2003/0178458 A1 * | 9/2003 | Trambley et al. | ............ | 224/326 |

* cited by examiner

*Primary Examiner*—Jes F. Pascua
*Assistant Examiner*—Lester L. Vanterpool
(74) *Attorney, Agent, or Firm*—Edgar W. Averill, Jr.; Kenneth L. Green

(57) ABSTRACT

A roof rack system that is a platform for any roof mounted products. Examples of such products include bikes, skis, snow boards, kayaks, canoes, or storage compartments or baskets. This system will fit any vehicle, any make, any model, any year, with a single stock keeping unit (SKU). It is also an attractive rack, even if it does not carry any products.

12 Claims, 4 Drawing Sheets

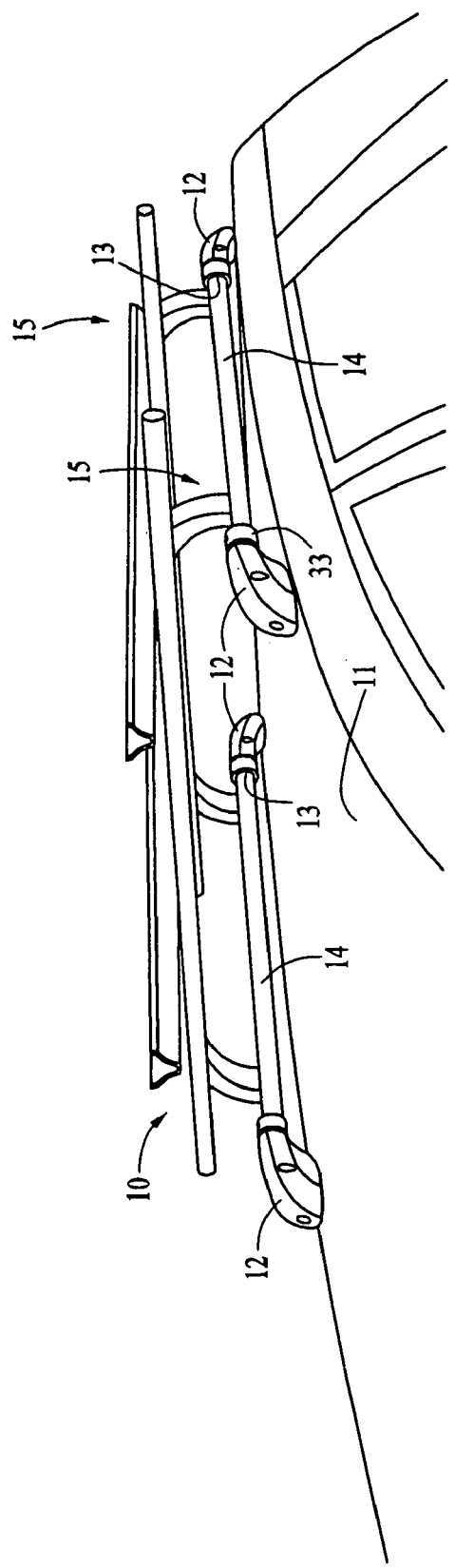
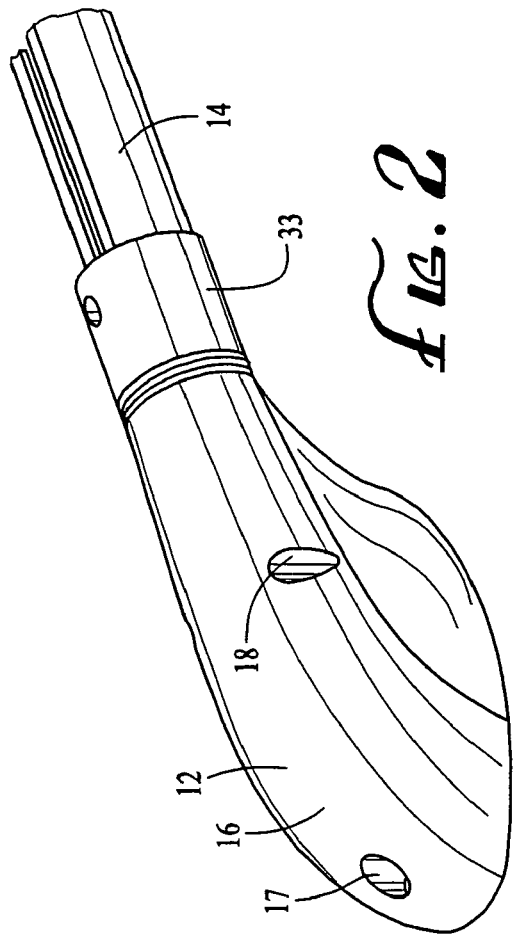

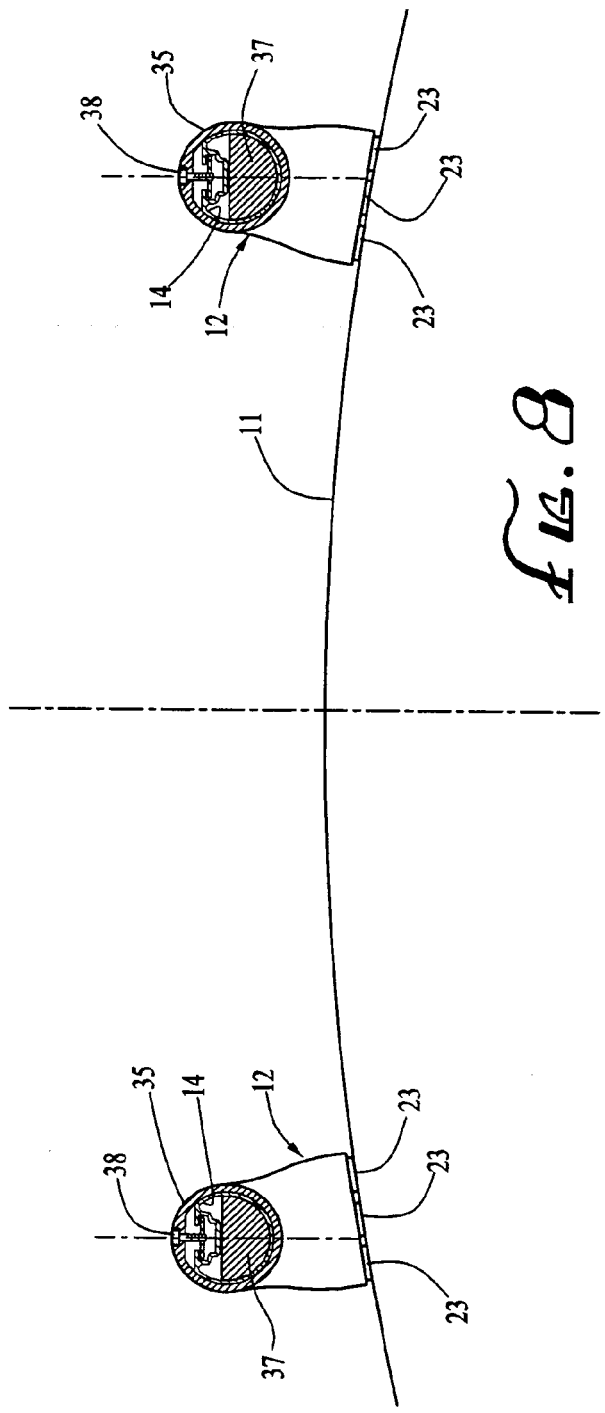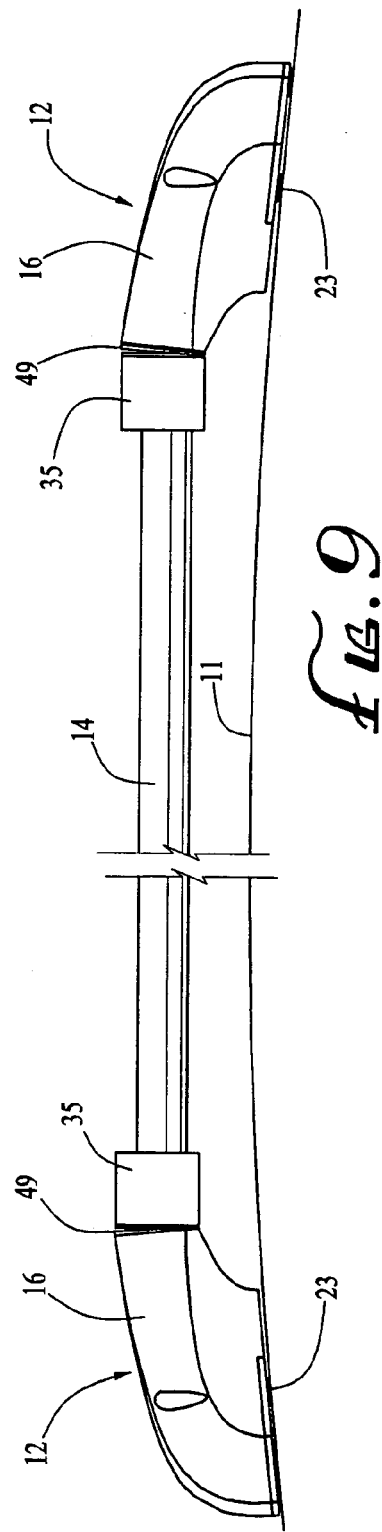

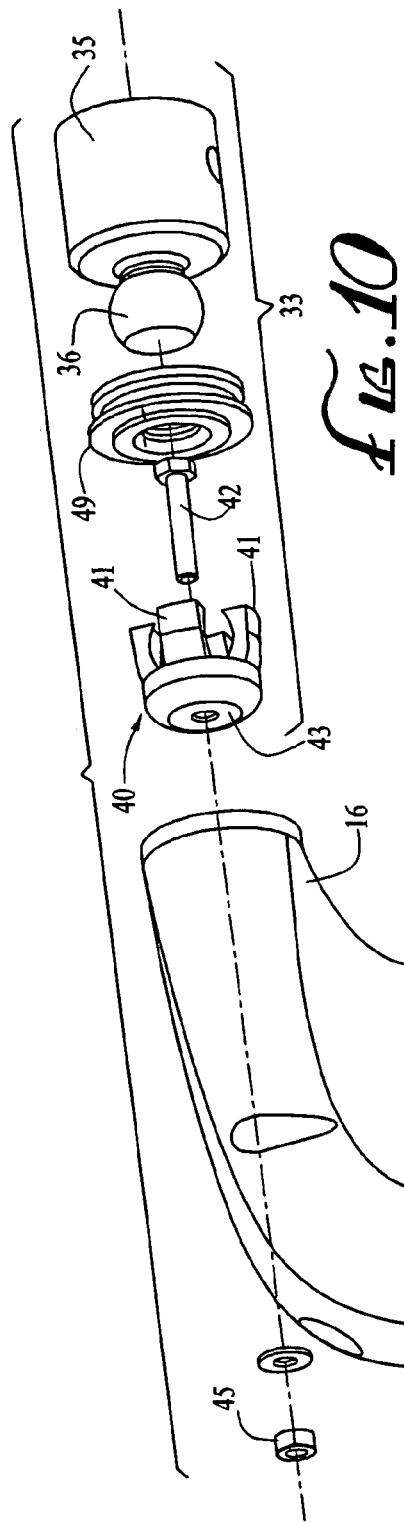
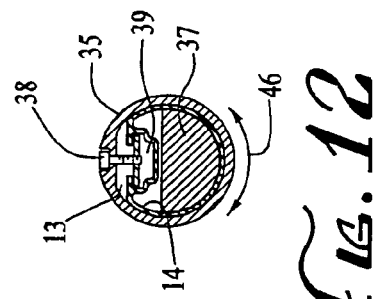
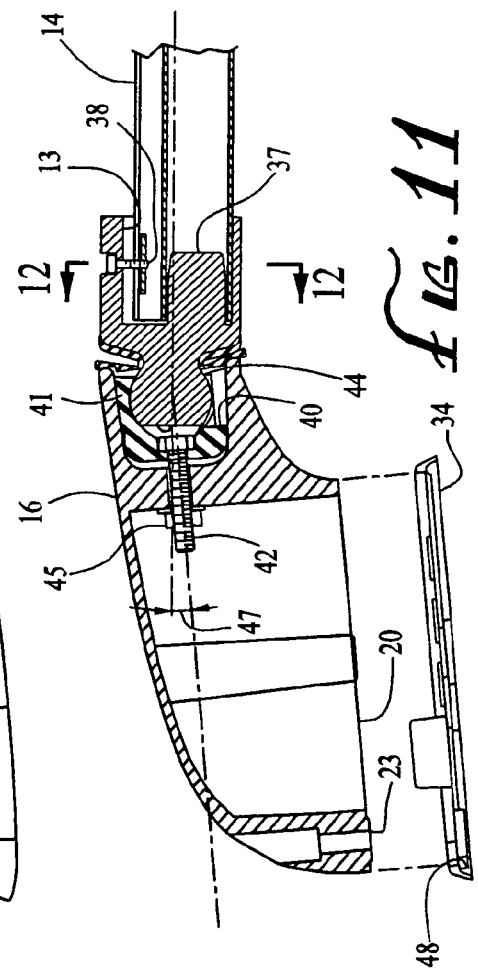

UNIVERSAL PLATFORM SYSTEM FOR HOLDING ACCESSORIES ON THE ROOF OF A WHEELED VEHICLE

BACKGROUND OF THE INVENTION

The field of the invention is roof racks for motor vehicles and the invention relates more particularly to roof racks which utilize a pair of rails, each rail being held by a forward and rearward securement member, such as a tower or pod affixed to the roof.

Numerous rack assemblies have been designed for carrying items on the top of motor vehicles. Common items include bicycles, skis, kayaks, and numerous other objects. A large number of roof racks utilize a single style of longitudinal rails and typically utilize front and rear cross bars each of which are held by a pod or tower at each side. Most commonly, when attached to the roof of a motor vehicle, the pods or towers are secured to the roof by a clip which extends into the inner surface of the door openings of the motor vehicle. Because of the large number of different vehicles available, a large number of towers and clips must be stocked by the dealer to supply a majority of customers with a tower/clip combination that conforms to the shape of a particular vehicle's door opening.

BRIEF SUMMARY OF THE INVENTION

It is an object of the present invention to provide a securement member assembly for holding the rails of a roof rack which securement members will fit the rooftop of essentially all motor vehicles.

It is another object of the present invention to provide a securement member which is fixed to a motor vehicle and includes a compensating member which permits the adjustment of the orientation of a rail with respect to the securement member.

The present invention is for a plurality of pod assemblies for holding a rail of a roof rack assembly mounted on the roof of a wheeled vehicle. Each pod assembly comprises a first cluster of attachment members, in a triangular pattern, held in the roof of a vehicle at a location where a pod is secured. Each attachment member has a portion, such as a swage nut, secured to the surface of the roof. A pod has a pod body having a base, an upper body surface, and a rail holding member affixed to the pod body. The pod body has a cluster of vertically oriented openings to hold attachment members, such as bolts, rivets, or other such attachment members, to mate with the first cluster of attachment members affixed to the vehicle. Each of the vertically oriented openings terminates at a lower end with a downwardly extending foot or projection extending below the base of the pod body. Each downwardly extending foot is supported by the roof. An attachment member, such as a bolt, is located in each vertically oriented opening and is secured to the portion held to the roof. The attachment member is tightened to force the downwardly extending feet, in a triangular or tripod pattern, to a fixed position with respect to the roof to secure the pod body in place. Because of the positioning effect of the downwardly extending foot, any curvature in the outer surface of the roof is separated from the base of the pod by the lifting effect of the downwardly extending feet. A compensating member is attached at an inner end of said pod body and is movable with respect to said pod body, said compensating member has a rail holding portion. The compensating member may be attached to the pod body by a ball and socket assembly. The compensating member permits the alignment of the compensating member with a rail so that the rail is held at each end by a compensating member of two pod assemblies.

BRIEF DESCRIPTION OF THE DRAWINGS

FIG. 1 is a perspective view of a roof rack, including the four pod assemblies of the present invention.

FIG. 2 is an enlarged perspective view of one of the pod assemblies of FIG. 1.

FIG. 8 is a cross-sectional view taken across the rails of FIG. 1.

FIG. 9 is a side view of the pod assemblies and a rail of FIG. 1.

FIG. 10 is an exploded perspective view of a pod assembly of FIG. 1.

FIG. 11 is a cross-sectional view of one of the pod assemblies of FIG. 1.

FIG. 12 is a cross-sectional view taken along line 12—12 of FIG. 11.

DESCRIPTION OF THE PREFERRED EMBODIMENTS

Figure 3:
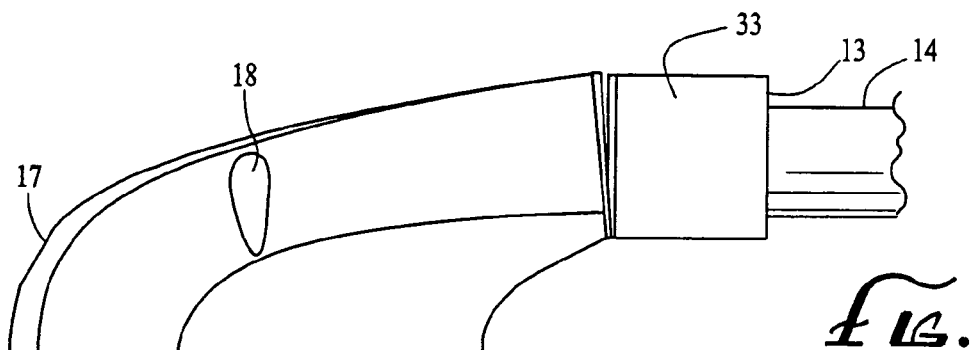
FIG. 3 is a side view of one of the pod assemblies of FIG. 1.
Figure 4:
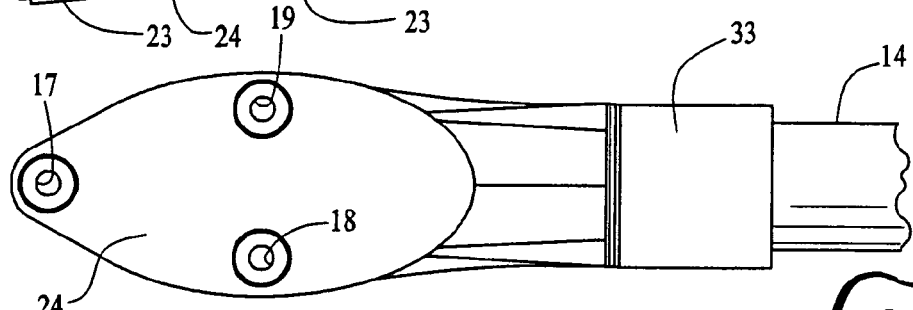
FIG. 4 is a bottom view of the pod assembly of FIG. 3.
Figure 5:
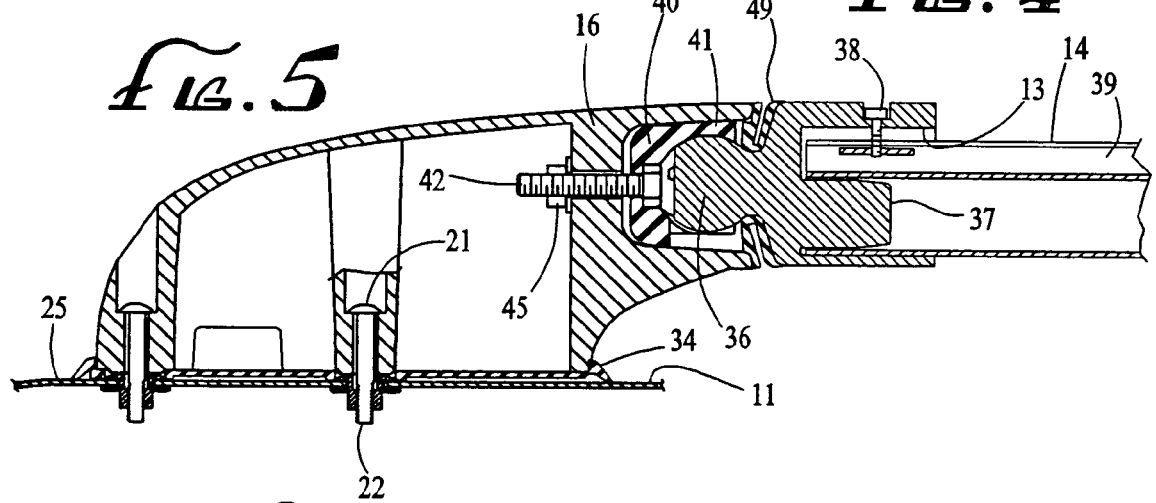
FIG. 5 is a cross-sectional view of one of the pod assemblies of FIG. 1 affixed to the roof of a motor vehicle.
Figure 6:
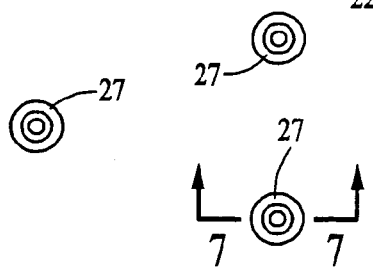
FIG. 6 is a top view of a first cluster of swage nuts.

A roof rack for wheeled vehicles is shown in perspective view in FIG. 1 on a motor vehicle which is indicated generally by reference character 10. The roof 11 of the motor vehicle supports four pods 12. Each pod has a rail securement portion, such as socket 13 shown in FIG. 5, which holds a portion, such as one end of a rail 14. The socket 13 is formed in one end of a compensating member held by each pod. The rail 14 is configured with a T-slot, and is made to accommodate rack components made by several companies, as indicated generally by reference character 15. These standard rack components do not comprise part of the present invention.

Many prior art towers are configured to be secured to the roof by a clip which fits in the door opening of the motor vehicle or, in older vehicles, the drip rail. As set forth above, door openings of different vehicles have different shapes and this necessitates the stocking of numerous different towers and clips for different motor vehicles.

Pod assembly 12 has a pod body 16 which has three vertically oriented openings, such as bolt openings 17, 18, and 19. As shown best in FIG. 5, each bolt opening has a lower floor 20 which abuts the head 21 of bolt 22.

It is to be understood that bolts are only one example of an attachment member and rivets or other such members may be used. A downwardly extending foot or projection 23, which is located below floor 20, raises the base 24 of pod body 16 above the outer surface 25 of roof 11.

The pod body 16 in some instances is also raised from the roof by a portion of the attachment member. An example of a preferred attachment member is swage nut 27 which has a slightly raised ring 26, shown best in FIG. 7 of the drawings.

Figure 7:
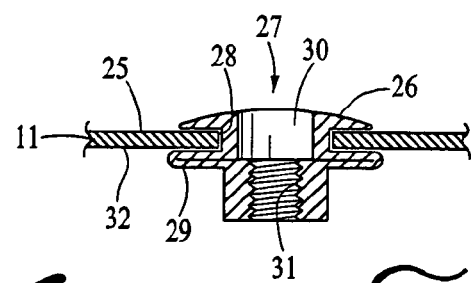
FIG. 7 is a cross-sectional view taken along line 7—7 of FIG. 6 showing the details of a swage nut.

Turning briefly to FIG. 7, swage nut 27 is held in a hole 28 drilled in the roof of the vehicle. The swage nut 27 is shown in a collapsed configuration in FIG. 7. Before being collapsed, the collapsed flange 29 has a cylindrical outer surface which readily fits within hole 28. A specially designed tool available for the swage nut is inserted into opening 30, threaded into female threads 31, and tightened to collapse flange 29 securely against the inner surface 32 of roof 11. This results in a slightly raised ring 26 which extends above outer surface 25 of roof 11. The amount of this extension usually does not exceed about 1/16th of an inch.

Because of the many different motor vehicle roof curvatures, the distance which base 24 is raised is critical so that the base will not touch the upper surface of the roof and cause any scratches. Once the pod is attached to the roof it typically is not removed but becomes a permanent part of the vehicle.

In order to install a roof rack, typically, the rack would be temporarily assembled on the roof and the location of the needed holes are marked. The holes are drilled at the marked locations. The swage nuts, or other appropriate fasteners, are then secured in place as shown in FIG. 7 and the pod assemblies and rails are secured to the roof.

The result is an assembly which allows a dealer to stock only one configuration of pod instead of requiring the stocking of a very large number of towers, brackets, and clips.

While the term "wheeled vehicle" is used in the claims, this is intended to include not only motor vehicles, but also wheeled vehicles, such as trailers, which are technically not motor vehicles.

The orientation of swage nuts in a tripod configuration is an important part of the present invention. Like any tripod, it is always stable and the downwardly extending foot or projection 23 holds the body of the pod above the roof surface. A rubber or plastic mounting gasket 34, shown best in FIGS. 10 and 11, may be used between the underside of the pod and the roof surface. The distance that the downwardly extending foot 23 extends below the base 24 of the pod and the raised portion of the attachment members is an important feature of the present invention. It has been found that a 0.040" spacing is sufficient for all tested motor vehicles, and thus, the base 24 of the pod is almost imperceptibly raised from the outer surface 25 of roof 11.

The particular configuration of rails and pods shown in the drawings is simply an example of one style of rack and pod. In FIG. 8, a pair of pods 12 are shown affixed to roof 11 and the cross-sectional shape of rails 14 are shown. Rails 14 have a conventional longitudinal groove 14' which supports conventional parts used to hold bicycles or other supported articles. Rails 14 have a partly cylindrical outer surface which permits twisting rail 14 so that the supported part may be oriented in the desired direction. A side view is shown in FIG. 9 where the insertion of rail 14 into rail socket 13 is evident. The essential factors of the invention is the combination of the tripod support and the downwardly extending feet which terminate below the base of the pod. Another important feature of the invention is the compensating member 33 shown best in FIGS. 10 and 11.

Compensating member 33 permits the adjustment of the socket 13 so that it can be aligned with a compensating member at an opposite end of a rail 14. One configuration of compensating member is a ball and socket assembly shown in FIGS. 5, 10 and 11. A socket portion 35 has a ball 36 at an inner end and the socket 13 at the other end. Socket 13 includes a rail insert member 37 within socket 13 to interlock the rail 14 so that it cannot rotate with respect to socket member 13. Rail 14 may be further secured in socket 13 by a bolt and plate assembly 38, the bolt portion of which fits within opening 39 in rail 14.

Socket portion 35 is held to pod body 16 by the tightening of the arms 41 of the socket 40 against ball 36. This is accomplished by the tightening of bolt 42 which pulls end wall 43 of socket 40 into the tapered opening 44. The walls of tapered opening 44 move the arms 41 against ball 36. Bolt 42 can be tightened on nut 45 externally by simply turning socket portion 35 with respect to pod body 16. The turning of socket portion 35 turns the socket 40 and the head of bolt 42 is held in a recess in end wall 43 so that the bolt turns with the socket 40 and the socket turns within the tapered opening 44 thereby moving deeper into tapered opening 44. This permits two important adjustments. First, the turning of socket portion 35 through an arc 46 allows the user to place the rail opening 39 so that it faces upwardly. This is shown best in FIG. 8 where the two rails 14 have their upper surfaces horizontal. Arc 46 actually is 360 degrees in the assembly shown in the drawings. Many prior art rack assemblies use an expensive tower with an angle adjustment feature so that the tower can be oriented vertically. This expense is eliminated with the turning ability of the present assembly. Secondly, the ball and socket assembly permits the angular adjustment of the socket portion 35 with respect to pod body 16 as shown in FIG. 11 and indicated by reference character 47. Thus, when the curvature of a particular roof 11 causes the pod body to be attached at a slight angle from the horizontal as shown in FIG. 11, the socket portion 35 can be adjusted to compensate for this angle.

Gasket 34 preferably has three openings 48 so that the downwardly extending foot or projection 23 can directly contact the fastener 27. A socket gasket 49 provides a seal between the pod body 16 and the socket portion 36.

Such pods may be secured to a wide variety of wheeled vehicle upper surfaces to hold a wide variety of members. Unlike the towers and clips now commonly used, only one pod style is necessary and, thus, expensive retail stocking is eliminated. While the socket is shown on the socket portion 35 it could instead be held by the pod body and socket 40 instead held by the pod body.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

We claim:

1. A pod assembly for holding an end of a rail of a roof rack assembly mounted on a roof of a wheeled vehicle, said pod assembly comprising:

a cluster of individual attachment members each of said attachment member of said cluster of individual attachment members being held in the upper outer surface of a roof of a wheeled vehicle at a location where said pod assembly is to be secured, each of said attachment members being secured to said roof;

a pod portion having a pod body having a base, a compensating member attached at an inner end of said pod body and being movable with respect to said pod body, said compensating member having a rail holding portion having a socket into which an end of a straight rail having a uniform cross-sectional shape may be inserted, said pod body having a cluster of openings positioned to mate with said cluster of attachment members, each of said openings terminating at a lower end with a downwardly extending foot extending below said base of said pod body; and a plurality of holding members each holding member being adapted to fit into each of said openings, each of said holding members being secured by one of said cluster of attachment members and each of said holding members being tightenable to force the downwardly extending foot toward the roof and into contact with one of said individual attachment members whereby any curvature in said outer surface of said roof is separated from said base of said pod body by the lifting effect of each of said downwardly extending feet of said pod body by the lifting effect of each of said downwardly extending feet.

2. The pod assembly of claim 1 wherein said rail holding portion of said compensating member turns through an arc with respect to said pod body to permit the straight rail to turn through an arc.

3. The pod assembly of claim 2 wherein said arc is a 360 degree arc.

4. The pod assembly of claim 1 wherein said pod has a pod central longitudinal axis and said compensating member has a compensating member central axis through the socket of the compensating member and said compensating member may be moved so that its compensating member central axis moves so that it can be aligned with a compensating member at an opposite end of said rail forming a compensating alignment angle with respect to said pod central, longitudinal axis.

5. The pod assembly of claim 1 wherein said compensating member has a ball at a pod end of said compensating member and said pod body has a socket attached to its inner and into which said ball fits.

6. The pod assembly of claim 5 wherein said socket is tightenable against said ball.

7. The pod assembly of claim 6 wherein said pod body has a tapered wall length and said socket has a plurality of arms which are urged together against said ball as said socket is moved longitudinally in said tapered wall length.

8. The pod assembly of claim 7 wherein said tapered wall tapers outwardly toward the inner end of said pod body.

9. The pod assembly of claim 1 further including an elastomeric gasket positioned between said pod body and said compensation member.

10. The pod assembly of claim 5 wherein said socket has a plurality of arms extending from a base and said base holds an attachment member adapted to be tightened into said pod body.

11. The pod assembly of claim 1 wherein said socket of said compensating member has a projection adapted to fit within a rail having a track on a top thereof to accommodate a slide-in device to hold a cross rail.

12. A support assembly for supporting a roof rack assembly on a wheeled vehicle, said support assembly including a pair of pod assemblies for holding both ends of a rail of said roof rack assembly, each pod assembly comprising:

first and second opposing clusters of three swage nut assemblies held in a roof of said wheeled vehicle at a location where first and a second pod assemblies are to be secured, said swage nut assemblies securing a female threaded nut under an inner surface of said roof and which have a slightly raised portion extending above an outer surface of said roof and both of said first and second opposing clusters of three swage nut assemblies having two inner swage nut assemblies and one outer swage nut assembly;

first and second pod assemblies each having a pod portion having a pod body having a base, a compensating member attached at an inner end of said pod body and being movable with respect to said pod body, said compensating member having a rail ball and socket member extending inwardly toward said pod body, said pod body having a cluster of three vertically oriented bolt openings positioned to secure bolts to mate with said first and second opposing clusters of swage nut assemblies, each of said vertically oriented bolt openings terminating at a lower end with a downwardly projecting foot positioned on said base of said pod body and each downwardly projecting foot resting on one of said first cluster of swage nut assemblies; and a bolt in each of said vertically oriented bolt openings, each of said bolts being threadingly secured into one of said female threaded nuts of a swage nut assembly and said bolt being tightened to force each downwardly projecting foot against the swage nut assembly whereby any curvature in said outer surface of said roof is separated from said base of each of said pods by the lifting effect of each of said downwardly projecting foot; and a rail having a first end held by a compensating member of said first pod assembly and a second end held by a compensating member of said second pod assembly and said compensating members having means for permitting the movement of said compensating members through an arc with respect to the pod body to which it is attached and said first and second compensating members being adapted to move so that a longitudinal axis of each compensating member can be adjusted so that their longitudinal axes are aligned.

\* \* \* \* \*